(12) United States Patent
Mahabadi et al.

(10) Patent No.: US 9,988,043 B2
(45) Date of Patent: Jun. 5, 2018

(54) METHODS AND SYSTEMS FOR DETERMINING A VEHICLE SPIN-OUT CONDITION

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Bakhtiar B. Litkouhi, Washington, MI (US); Shih-Ken Chen, Troy, MI (US); Nikolai K. Moshchuk, Grosse Pointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/228,869

(22) Filed: Aug. 4, 2016

(65) Prior Publication Data
US 2018/0037222 A1    Feb. 8, 2018

(51) Int. Cl.
*B60W 40/101* (2012.01)
*B60W 30/02* (2012.01)
*B60W 40/103* (2012.01)
*B60W 50/00* (2006.01)
*B60W 50/14* (2012.01)

(52) U.S. Cl.
CPC .......... *B60W 30/02* (2013.01); *B60W 40/101* (2013.01); *B60W 40/103* (2013.01); *B60W 50/0097* (2013.01); *B60W 50/14* (2013.01); B60W 2050/143 (2013.01); B60W 2050/146 (2013.01); B60W 2510/202 (2013.01); B60W 2520/10 (2013.01); B60W 2520/125 (2013.01); B60W 2520/14 (2013.01); B60W 2520/18 (2013.01)

(58) Field of Classification Search
CPC .. B60W 30/02; B60W 40/101; B60W 40/103; B60W 50/0097; B60W 50/14; B60W 2050/143; B60W 2050/146; B60W 2510/202; B60W 2520/10; B60W 2520/125; B60W 2520/14; B60W 2520/18

See application file for complete search history.

(56) References Cited

U.S. PATENT DOCUMENTS

| | | | |
|---|---|---|---|
| 6,895,317 B2* | 5/2005 | Yasui ................. | B60G 17/0195 180/197 |
| 2005/0096830 A1* | 5/2005 | Ohta ................... | B60K 28/165 701/91 |
| 2005/0125131 A1* | 6/2005 | Kato ...................... | B60T 8/172 701/70 |

OTHER PUBLICATIONS

Song et al., Pneumatic Trail Based Slip Angle Observer with Dugoff Tire Model, 2014, IEEE, p. 1127-1132.*

(Continued)

*Primary Examiner* — McDieunel Marc
(74) *Attorney, Agent, or Firm* — Lorenz & Kopf, LLP

(57) ABSTRACT

Methods and systems are provided for determining vehicle spin-out conditions including conditions indicative of a vehicle spin-out ahead of the vehicle actually spinning-out. The methods and systems receive motion parameters of a vehicle based on sensed signals from at least one vehicle sensor of an electronic power steering system and an inertial measurement unit. The method and systems estimate pneumatic trail based on a rate of change of self-aligning torque with respect to axle lateral force. The methods and systems determine vehicle spin-out conditions based on the estimated pneumatic trail. The methods and systems control at least one feature of a vehicle in response to the determined vehicle spin-out conditions.

12 Claims, 5 Drawing Sheets

(56) References Cited

OTHER PUBLICATIONS

Han et al., Early Detection of Tire-Road Friction Coefficient based on Pneumatic Trail Stiffness, 2016, IEEE, p. 6326-6331.*
Hsu et al., Estimation of Tire Slip Angle and Friction Limits Using Steering Torque, 2009, IEEE, p. 896-907.*
Minaki et al., Study on Cornering Stability Control Based on Pneumatic Trail Estimation by Using Dual Pitman Arm Type Steer-By-Wire on Electric Vehicle, 2010, IEEE, p. 1-8.*

* cited by examiner

METHODS AND SYSTEMS FOR DETERMINING A VEHICLE SPIN-OUT CONDITION

TECHNICAL FIELD

The technical field generally relates to determining at least one vehicle spin-out condition, and more particularly relates to estimation of pneumatic trail for determining at least one vehicle spin-out condition and controlling a vehicle based thereon.

BACKGROUND

Dynamics control systems are increasingly used in automotive vehicles to improve vehicle safety and satisfy government regulations. Examples of such systems include vehicle active safety systems like vehicle electronic stability control (ESC) systems, comprehensive safety vehicle (CSV) systems, and vehicle lane change assist systems. For those safety systems to operate effectively, accurate and timely knowledge of vehicle dynamic states are required.

When a moving vehicle has "spun" such that the vehicle's corresponding velocity vector is pointing to the side, stability control systems can provide little benefit to the directional control of the vehicle. In this case, the stability control system can be disabled until the vehicle has been properly oriented.

A determination of vehicle spin-out conditions ahead of actual vehicle spin-out may allow a vehicle driver and/or vehicle active safety systems to counteract driving behavior leading to vehicle spin-out.

Accordingly, the need exists for a system and method for determining vehicle spin out-conditions, possibly including precursor vehicle spin-out conditions and actual vehicle spin-out. In addition, it is desirable to implement such a system and method using available sensed signal and in a processing efficient scheme. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for determining at least one vehicle spin-out condition, comprising: receiving at least one motion parameter of a vehicle based on sensed signals from at least one vehicle sensor; estimating pneumatic trail for at least one tire of the vehicle using the at least one motion parameter; and determining at least one vehicle spin-out condition based on the estimated pneumatic trail.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
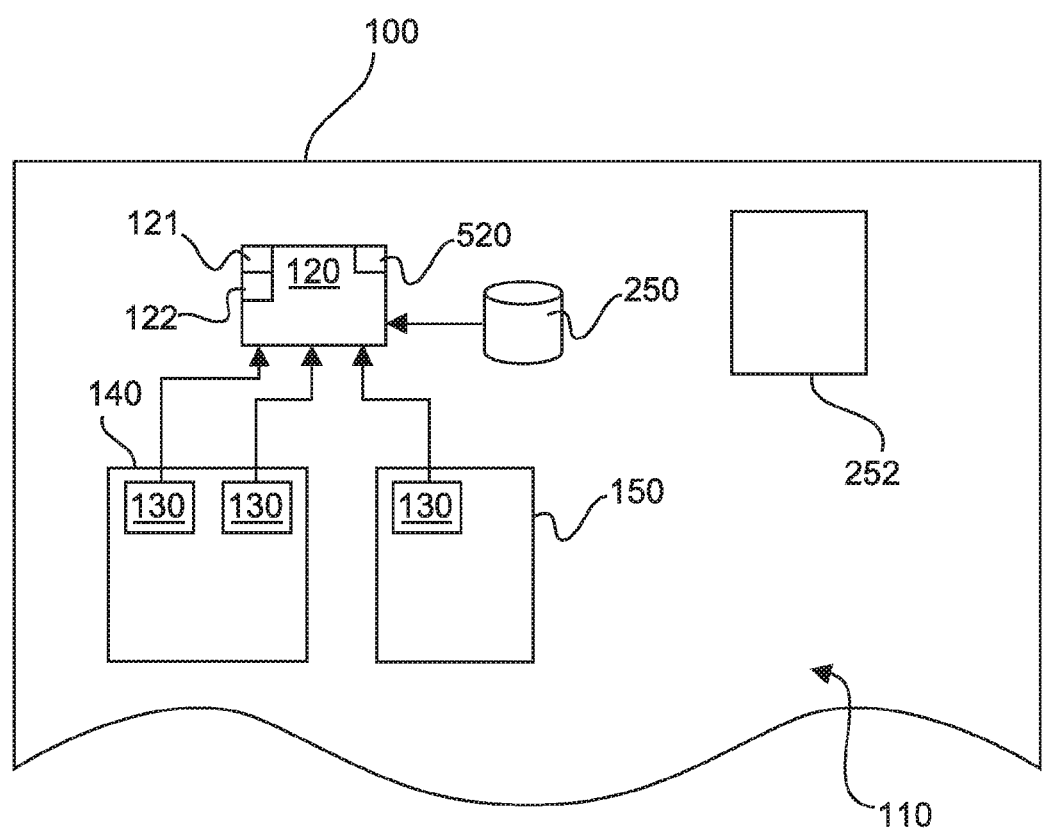
FIG. 1 is a functional block diagram of a vehicle having modules for determining at least one vehicle spin-out condition in accordance with various embodiments.
Figure 5:
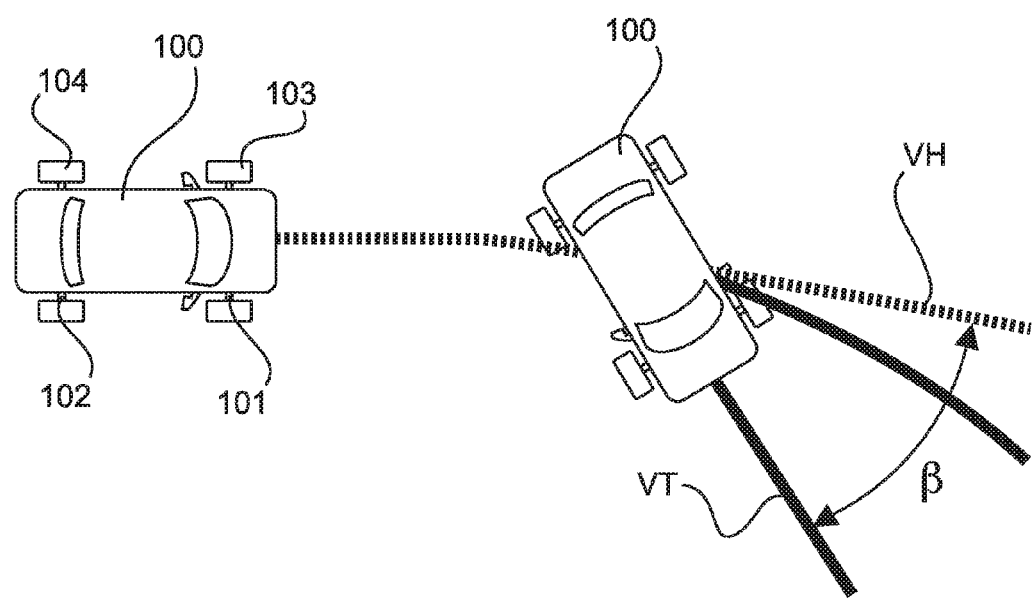
FIG. 5 is a schematic drawing illustrating progression of vehicle during a vehicle spin-out.

With reference to FIG. 1, an exemplary vehicle 100 in part that includes a control system 110 is shown in accordance with exemplary embodiments. As can be appreciated, the vehicle 100 may be any vehicle type that could be subject to vehicle spin-out, which is when a vehicle spins in an uncontrolled way due to a direction in which the vehicle 100 is heading VH and a direction in which the vehicle 100 is travelling VT differing excessively, as schematically illustrated in FIG. 5. An angle between the direction of vehicle heading VH and the direction of vehicle travel is a vehicle side slip angle β. Although the figures shown herein depict an example with certain arrangements of elements, additional intervening elements, devices, features, or components may be present in actual embodiments. It should also be understood that FIG. 1 is merely illustrative and may not be drawn to scale.

In an exemplary embodiment, the vehicle 100 includes a front axle 101 having front wheels 103 thereon and a rear axle 102 having rear wheels 104 thereon. The skilled reader will appreciate that the axles 101, 102 are shown in exaggerated protruding form purely for the purposes of illustration.

The control system 110 includes a control module 120 that receives inputs from one or more sensors 130 of the vehicle 100. The sensors 130 sense observable conditions of the vehicle 100 and generate sensor signals based thereon. For example, the sensors 130 may sense conditions of an electric power steering (EPS) system 140 of the vehicle 100, an inertial measurement unit 150 of the vehicle 100, and/or other systems of the vehicle 100 and generate sensor signals based thereon. The sensors 130 may sense one or more of the following vehicle motion parameters and generate corresponding control signals: lateral acceleration, yaw rate, EPS torque, steering angle, longitudinal velocity, vehicle roll angle, etc. In various embodiments, the sensors 130 communicate the signals directly to the control module 120 and/or may communicate the signals to other control modules (not shown) which, in turn, communicate data from the signals to the control module 120 over a communication bus (not shown) or other communication means.

In exemplary embodiments, the control system 110 further includes a non-volatile memory 250 storing various look-up parameters as described further herein. The control system 110 includes an instrument panel 252 that provides an interface with a driver to receive inputs from the driver and to provide outputs to the driver. The instrument panel 252 may include a display, such as indicator lights and/or a graphical user interface, through which outputs can be made.

The control module 120 receives the signals and/or the data captured by the sensors and estimates pneumatic trail for one or more tires of the vehicle using the sensed signals. The control module 120 determines at least one vehicle spin-out condition based on the estimated pneumatic trail. The control module 120 then uses the vehicle spin-out condition to control one or more features of the vehicle 100, as described further below. The control module 120 of FIG. 1 (and the various sub-modules included therein as described below with respect to FIG. 2) may be implemented by a combination of at least one computer program 121 executed on at least one processor 122 of the vehicle 100.

The estimated pneumatic trail may provide an early indication of side slip angle β and thus potential vehicle spin-out conditions. In particular, when side slip angle β breaches a predetermined threshold, vehicle spin-out can be determined to have taken place. The estimated pneumatic trail correlates tire self-aligning toque (SAT) and tire lateral force and is able to provide a preemptive warning of tire force saturation, which is a likely precursor to vehicle spin-out.

When tire force is saturated, the limits of the tire/road capacity have likely been reached. Any force requested beyond that limit will potentially result in vehicle instability and possibly vehicle spin-out, or at least conditions potentially leading to vehicle spin out unless corrective measures are taken. Tire force saturation is indicated by tire SAT and tire lateral force and thus also by pneumatic trail. An interesting characteristic of SAT is that it shows tire force saturation before the lateral forces are saturated. The control module 120 is able to take the advantage of this SAT characteristic, through the estimated pneumatic trail, to provide an early indication of a vehicle spin-out condition, which allows subsequent steps to be taken through a feature control module 520, such as warning a driver, taking automated EPS countermeasures, and commencing calculation of vehicle side slip angle β, before vehicle spin-out has actually occurred.

Figure 2:
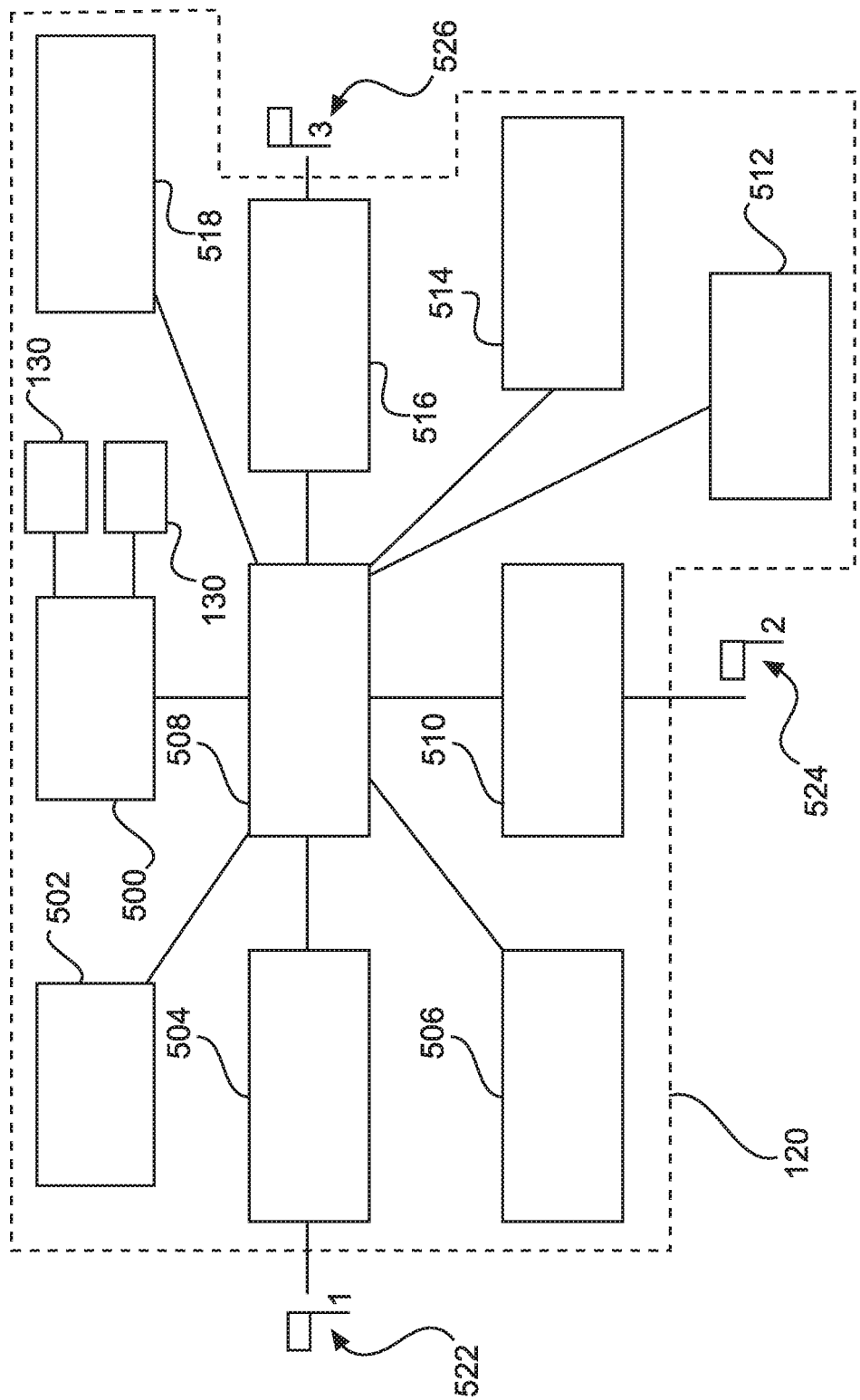
FIG. 2 is a diagram of exemplary sub-modules for determining at least one vehicle spin-out condition in accordance with various embodiments.

Referring now to FIG. 2, and with continued reference to FIG. 1, a diagram illustrates sub-modules included in the control module 120 in accordance with various exemplary embodiments. As can be appreciated, various exemplary embodiments of the control module 120, according to the present disclosure. In various exemplary embodiments, the sub-modules shown in FIG. 2 may be combined and/or further partitioned to similarly determine at least one vehicle spin-out condition and to control one or more components of the vehicle 100 based thereon. In various embodiments, the control module 120 includes a sensor module 500, an SAT estimation module 502, a first vehicle spin-out condition module 504, a front axle lateral force estimation module 506, a central processing module 508, a second vehicle spin-out condition module 510, a pneumatic trail estimation module 512, a side slip angle estimation module 514, a third vehicle spin-out condition module 516, a rear axle slip angle estimation module 518 and a feature control module 520.

The central processing module 508 provides high level control and communication between the various modules. In particular, collaboration of results of the various modules, as explained in overview with respect to the flow charts of FIGS. 3 and 4 can be executed using the central processing module 508.

The sensor module 500 receives as input sensed parameters from the EPS and/or the IMU sensors 130. For example, the sensed parameters can include, but are not limited to, EPS delivered torque and steering angle that may be sensed directly from the EPS system 140 or determined indirectly from other sensed values, yaw rate, lateral speed, longitudinal speed, and vehicle roll angle that may be sensed directly from the vehicle IMU 150 or determined indirectly from other sensed values.

The pneumatic trail estimation module 512 estimate pneumatic trail based on the sensed lateral acceleration, yaw rate and EPS torque. These sensed values are readily available from sensors of the IMU and the EPS. Tire or axle lateral force is determinable based on lateral acceleration and yaw rate and SAT is determinable based on electronic power steering torque in known ways. SAT and axle lateral force are able to be combined to estimate pneumatic trail based on a known relationship (described further below) between pneumatic trail, tire lateral force and SAT.

The front axle lateral force estimation module 506 estimates at least one lateral axle force, for example based on sensed lateral acceleration and yaw rates from the sensors 130. The at least one lateral axle force may be for a front axle 101 of the vehicle 100. The pneumatic trail estimation module 512 estimates pneumatic trail using at least the estimated lateral force. The axle lateral force for a front axle 101 may be calculated based on the following equation:

$$F_{yf} = Ma_y - \frac{L_f Ma_y - I\dot{r}}{L} \quad \text{(equation 1)}$$

In equation 1, $F_{yf}$ represents front axle lateral force, $L_f$ represents the distance from the vehicle center of gravity to the front axle 101, I is the yaw moment of inertia, M is the vehicle mass, $\dot{r}$ is the estimated rate of change of yaw rate with respect to time and L is the length of wheel base (the distance between the front and rear axles 101, 102). The parameters of equation 1 include values obtainable from the sensor 130 embodied in the IMU, specifically estimated yaw rate and axle lateral force, or are otherwise vehicle constants stored in memory 250. As the sensed yaw rate is usually an almost clean signal, $\dot{r}$ can be estimated accurately enough based on r from the sensors 130 of the IMU. Other algorithms and equations than that of equation 1 for determining axle lateral force are possible.

The SAT estimation module 502 estimates tire SAT, for example based on sensed EPS torque from the sensors 130 (via the sensor module 500). The pneumatic trail estimation module 512 estimates pneumatic trail using at least the SAT from the SAT estimation module 502. The SAT may be estimated using known algorithms such as that disclosed in U.S. Pat. No. 8,634,986, which document, particularly the portion concerned with estimating SAT based on sensed EPS torque, is hereby incorporated by reference.

The pneumatic trail estimation module 512 estimates pneumatic trail using the SAT from the SAT estimation module 502 and the front axle lateral force estimation module 506. The pneumatic trail estimation module 512 determines a relationship between the estimated S and the lateral axle force and estimates the pneumatic trail using the relationship. For example, the relationship may be a rate of change of the estimated SAT with respect to the estimated lateral axle force.

In a particular embodiment, the pneumatic trail estimation module 512 estimates pneumatic trail using the following equation:

$$\tau_a = \hat{F}_y * \frac{(t_m(\delta) + \hat{t}_p)}{\Gamma_f} \quad \text{(equation 2)}$$

In equation 2, $t_m$ represents mechanical trail (which is a function of steering angle $\delta$), $\hat{t}_p$ represents estimation of pneumatic trail, $\Gamma_f$ represents total trail, $\tau_a$ represents SAT and $\hat{F}_y$ represents an estimate of front axle lateral force. SAT and front axle lateral force can be determined as described above from the SAT estimation module 502 and the axle lateral force estimation module. Based on these estimated values, the total trail can be determined. Since mechanical trail does not vary greatly, total trail can be used to estimate pneumatic trail. Total trail in equation 2 can be considered to represent a relationship between SAT and axle lateral force, namely the rate of change or slope of SAT with respect to axle lateral force.

In various embodiments, the pneumatic trail estimation module 512 uses a Kalman filter, a least squares method (e.g. a recursive least squares method), or other averaging or filtration based algorithms to determine the slope between estimate SAT values and estimated axle lateral force values, thereby to estimate pneumatic trail. One example for real time estimation of pneumatic trail, $\hat{t}_p$ is a recursive least squares method with forgetting factor, as known to the skilled person.

From equation 2, it can be understood that the pneumatic trail may be comprised in total trail (which is a combination of mechanical trail and pneumatic trail), which is obtained from the slope determined by the pneumatic trail estimation module 512. Accordingly, total trail may be used by the control module 120 in determining the at least one vehicle spin-out condition. Alternatively, the pneumatic trail can be estimated separately from total trail by applying a correction factor to total trail, as determined from the slope, to compensate for (e.g. subtract) mechanical trail.

In various embodiments, the first vehicle spin-out condition module 504 determines a state of decreasing pneumatic trail, which has been estimated by the pneumatic trail estimation module 512. The first vehicle spin-out condition module 504 determines a first vehicle spin-out condition in response to the state of decreasing pneumatic trail. The pneumatic trail may be required to be decreasing for a predetermined amount of time for the state of decreasing pneumatic trail to be determined. Such decreasing pneumatic trail can provide an early indication of the sort of vehicle instability that can lead to vehicle spin-out. The first vehicle spin-out condition module 504 may issue a first flag 522 in response to determining the state of decreasing pneumatic trail. The feature control module 520 operates with the instrument panel 252 of the vehicle 100 to respond to the first flag 522 by outputting a spin-out warning to the driver of the vehicle 100.

In various embodiments, the second vehicle spin-out condition module 510 compares the estimated pneumatic trail to a predetermined pneumatic trail threshold to determine a second vehicle spin out condition based on the comparison. The threshold may be indicative of pneumatic trail that has reached a low point indicative of high slip angles corresponding to saturated SAT. After the threshold is passed, vehicle control will become unstable and there is a possibility of vehicle spin-out. The predetermined pneumatic trail threshold may be determined based on experiments and stored in the vehicle memory 250. The second vehicle spin-out condition module 510 may determine the second vehicle spin-out condition based on the predetermined pneumatic trail threshold being breached for a predetermined amount of time.

In various embodiments, the central processing module 508 obligates that second vehicle spin-out condition module 510 to run only in response to the first vehicle spin-out condition module 504 determining the first vehicle spin-out condition.

In various embodiments, the second vehicle spin-out condition module 510 outputs a second flag 524 in response to the determined second vehicle spin-out condition. The feature control module 520 may operate with an automated vehicle control system such as the EPS system 140 in responsive to the determined second vehicle condition or the second flag 524 by controlling the vehicle 100 so as to counteract vehicle spin-out.

In various embodiments, the second vehicle spin-out condition module 510 may, additionally or alternatively to the technique described above by which the estimated pneumatic trail is compared to a predetermined threshold, determine the second vehicle spin-out condition based on an estimate of axle slip angle by the rear axle slip angle estimation module 518.

In various embodiments, the pneumatic trail estimation module 512 estimates pneumatic trail for one of front and rear axles, usually the front axle 101 of the vehicle 100. The rear axle slip angle estimation module 518 estimates a slip angle of the other axle, usually the rear axle. The rear axle slip angle estimation module 518 may estimate the slip angle using at least one of steering angle, yaw rate and longitudinal velocity obtained from the sensors 130 (through the sensor module 500). The second vehicle spin-out condition module 510 determines the second vehicle spin-out condition based on the estimated slip angle of the other axle. In particular, the second vehicle spin-out condition module 510 compares the estimated slip angle with a predetermined slip angle threshold to determine the second vehicle spin-out condition. The predetermined slip angle threshold may be empirically determined to correspond to a value at which vehicle spin out is likely and stored in the memory 250.

In various embodiments, the central processing module 508 requires that the rear axle slip angle estimation module 518 is run, e.g. estimating rear axle slip angle, only when estimated pneumatic trail has been determined not to be above the predetermined threshold for the other axle, which may be the front axle 101. Such a constraint necessitates that the axle slip angle is estimated for one axle 101, 102 only when there is a negligibly small axle slip angle for the other axle.

In this example, the case is taken of the axle lateral force estimation module 506 operating with respect to the front axle 101 and the axle slip angle estimation module 518 operating with respect to the rear axle. The following equations are known for front axle and rear axle slip angle estimation:

$$\alpha_f = \delta - \frac{v_y + ar}{u} \quad \text{(equation 3)}$$

$$\alpha_r = -\frac{v_y - br}{u} \quad \text{(equation 4)}$$

By subtracting equation 4 from equation 3, the following equation can be derived:

$$\alpha_r = \alpha_f - \delta + \frac{Lr}{u} \quad \text{(equation 5)}$$

Since it is known that front angle slip angle $\alpha_f$ is small $|\alpha_f|<\alpha^*_f$, where $\alpha^*_f$ is a calibration parameter, a large rear axle slip angle $\alpha_r$ can be identified if:

$$\left|-\delta + \frac{Lr}{u}\right| > |\alpha^*_r| \quad \text{(equation 6)}$$

where $\alpha^*_r$ is a another calibration parameter.

In equation 6, $\delta$ represents steering angle, r is yaw rate, and u is the longitudinal velocity, all of which can be obtained from the sensors 130 (via the sensor module 500). L is the length of wheel base, which is a known vehicle constant.

Using equation 6, the rear axle slip angle estimation module 518 estimates rear axle slip angle $\alpha_r$. The second vehicle spin-out condition module 510 compares the rear axle slip angle with the predetermined slip angle threshold from memory 250 to determine the second vehicle spin out condition and optionally issue the second flag 524.

In various embodiments, the third vehicle spin-out condition module 516 estimates a third vehicle spin-out condition based on the estimated vehicle side slip angle. The third vehicle spin-out condition module 516 estimates the vehicle side slip angle in response to at least one of the determined first and second vehicle spin-out conditions as determined respectively by the first and second vehicle spin-out condition modules 504, 510.

The vehicle side slip angle is estimated by the side slip angle estimation module 514 as described below. It may be processing intensive to estimate vehicle side slip angle because it involves integration of a vehicle spin out factor as described below. Such processing can be deferred until at least one of the first and second vehicle spin-out conditions have been determined without compromising the ability to determine actual vehicle spin-out. In particular, if the first and second vehicle spin-out conditions have not been determined as indicating a potential spin-out condition, there is no need to move to the step of estimating vehicle side slip angle as vehicle spin-out will not be occurring. As illustrated in FIG. 5, the spin-out factor $\dot{\beta}_x$, and the related side slip angle, indicates a large difference between a direction of vehicle heading VH, e.g. as set by the steering angle, and a direction of vehicle travel VT. That is, the spin-out factor indicates a tendency of the vehicle to spin-out. The spin out factor corresponds to a rate of change with respect to time of vehicle side slip angle $\beta_x$.

In various embodiments, the third vehicle spin-out condition module 516 compares the vehicle side slip angle with a predetermined vehicle side slip angle threshold, $\beta^*$, and determines the third vehicle spin-out condition based on the comparison. The vehicle side slip angle threshold may be determined by experimentation and stored in the memory. The vehicle side slip angle threshold is set to indicate a likelihood of vehicle spin-out. When the threshold is exceeded, the third vehicle spin-out condition is able to be determined. The third vehicle spin-out condition module 516 may output a third flag 526 in response to the third vehicle spin-out condition. An automated vehicle control system, such as at least one of a safety control system vehicle electronic stability control (ESC) systems, comprehensive safety vehicle (CSV) systems, and vehicle lane change assist systems, a chassis control system and the EPS system 140, may be at least partially shut down in response to the determined third condition or the third flag 526.

The side slip angle estimation module 514 may estimate vehicle side slip angle based on lateral acceleration, longitudinal velocity and yaw rate as obtained from the at least one sensor 130 of the IMU 150 via the sensor module 500. A further sensed parameter may be vehicle roll angle for use in determining the side slip angle.

In various embodiments, the side slip angle estimation module 514 estimates vehicle side slip angle by an integration or summation based computation. The integration or summation based computation may integrate or sum successive calculated spin out factor values, e.g. rate of change of side slip angle. The integration of rate of change of side slip angle results in an estimated vehicle side slip angle for use by the third vehicle spin-out condition module 516 described above.

The following equation may be integrated or iteratively summed to estimate side slip angle:

$$\dot{\beta}_x = -\kappa\beta_x + \frac{(a_y + g\sin(\psi))}{u} - r \quad \text{(equation 7)}$$

$\kappa$ is the filter gain, $\beta_x$ is the estimated side slip angle, u, $a_y$, g, $\psi$, r are longitudinal velocity, lateral acceleration, gravity acceleration, vehicle roll angle and yaw rate respectively, all of which are available either as constants (gravity) or are obtained from sensed signal from the IMU sensor 130 via the sensor module 500. Equation 7 makes it possible to reduce processing requirements for determining vehicle side slip angle, whilst also protecting the estimation of vehicle slip angle from divergence at the same time. Pseudo integration, e.g. a low-pass filter, can be employed to integrate equation 7.

It has been found that estimation of side slip angle tends to failure if pure integration is used for estimation due to the existence of noise and bias in real measurements. The failure usually appears in a form of accumulated error when the integration is performed for a relatively long period of time. The present algorithm combats such error accumulation issues by performing a rough estimation of side slip angle using integration only over a relatively short period of time. The relatively short period of time is determined by the third vehicle spin-out condition module 516 and the side slip angle estimation module 514 operating together to perform the integration only when the second vehicle spin-out condition has been determined by the second vehicle spin-out condition module 510, optionally based on the second flag 524. The third vehicle spin-out condition module 516 resets the integration in response to the second vehicle spin out condition no longer being determined by the second vehicle spin-out condition module 510, as described more fully in the following.

The integration or summation based computation performed by the side slip angle estimation module 514 may be initiated based on the estimated pneumatic trail from the pneumatic trail estimation module 512. For example, the integration or summation based computation may be initiated in response to a comparison of the estimated pneumatic trail and the predetermined pneumatic trail threshold, as carried out by the second vehicle spin-out condition module 510. The comparison requires the pneumatic trail to be lower than the predetermined pneumatic trail threshold, which is indicative of high slip angles and vehicle instability as has been heretofore described. The integration or summation based computation conducted by the side slip angle estimation module 514 may be reset based on the estimated pneumatic trail being above the pneumatic trail threshold. In this way, the integration or summation computation is carried out for a short lived period that persists only when a comparison between pneumatic trail and the predetermined pneumatic trail threshold indicates vehicle instability, to ease processor workload and to allow a sufficiently accurate rough estimation of the vehicle side slip angle.

In various embodiments, the feature control module 520 (FIG. 1) is responsive to the determined at least one vehicle spin-out condition from at least one of the first, second and third vehicle spin-out condition modules 504, 510, 516 to provide a command to control an associated vehicle feature. For example, the feature control module 520 may be responsive to at least one of the first, second and third flags 522, 524, 526 to provide a control command to at least one of a vehicle control system such as the EPS system 140 and the instrument panel 252. The vehicle control system may be configured to respond to the output by shutting down at least one function or by automated control of vehicle steering or other automated vehicle function to counteract vehicle spin-out. The instrument panel may be configured to output a spin-out warning for a driver of the vehicle. The warning may be an indicator on a display and/or a sound warning.

In various embodiments, the first condition of vehicle spin-out may be a pre-emptive condition in that it is met prior to actual vehicle spin-out. There are sufficient seconds available for a warning light or other driver indicator (e.g. audible) to be provided by the feature control module 520. It will allow a driver to take counteracting measures to reduce risk of vehicle spin-out.

In various embodiments, the second condition of vehicle spin-out indicates a likelihood of vehicle spin-out either having occurred or being about to occur. The second condition may occur too close in time to vehicle spin-out for a driver to react to any warning. Accordingly, the feature control module 520 may issue a command to an automated vehicle control system, such as the EPS system 140, to respond to the second condition by taking corrective measures to avert vehicle spin-out, if possible.

In various embodiments, the third condition of vehicle spin-out indicates that vehicle spin-out has actually occurred. In such a condition, certain automated vehicle control systems should be shut down to avoid energy being put in to the vehicle that is spinning and thus potentially exasperating the vehicle spin. The feature control module 520 thus issues a suitable shut-down command to an automated vehicle control system such as the EPS system 140 or vehicle safety system like vehicle electronic stability control (ESC) systems, comprehensive safety vehicle (CSV) systems, and vehicle lane change assist systems.

Figure 3:
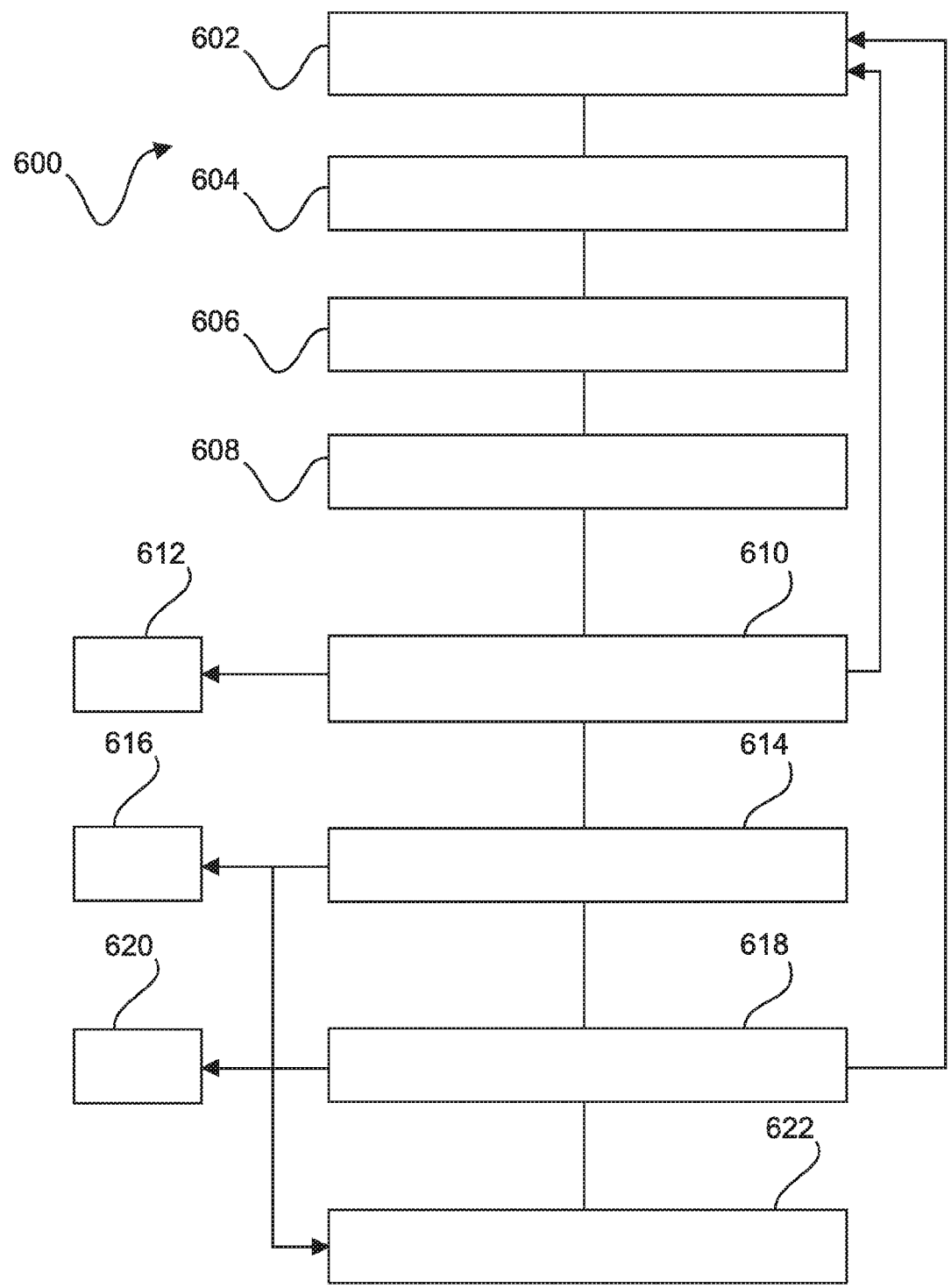
FIG. 3 is a flowchart illustrating a first part of a processing method for determining vehicle spin-out conditions in accordance with various embodiments.
Figure 4:
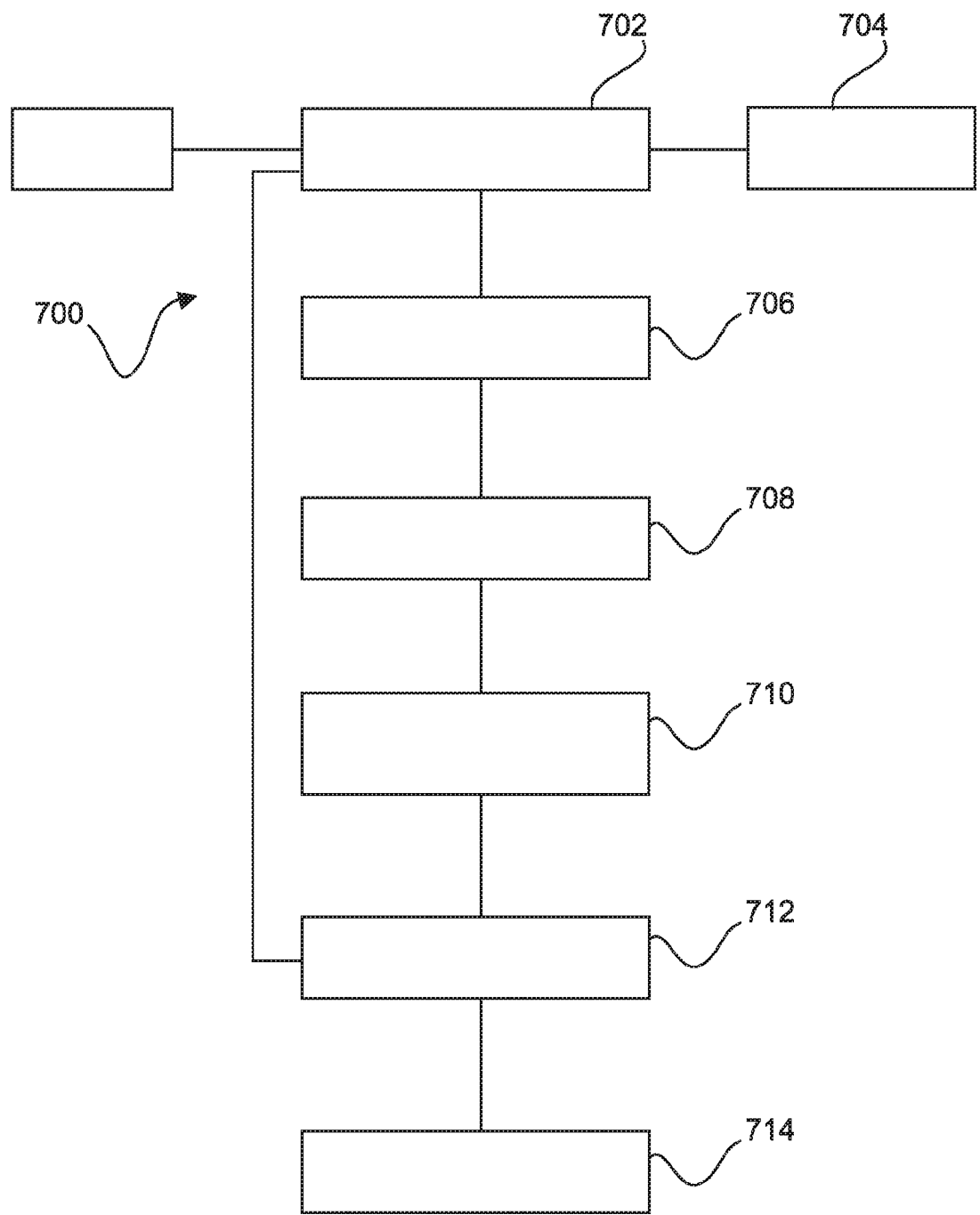
FIG. 4 is a flowchart illustrating a second part of a processing method for determining vehicle spin-out conditions in accordance with various embodiments.

With reference now to FIGS. 3 and 4, and with continued reference to FIGS. 1-2, flowcharts are shown of methods 600, 700 for determining at least one vehicle spin-out condition and controlling a vehicle 100 based thereon, in accordance with various embodiments. The methods 600, 700 can be implemented in connection with the vehicle 100 of FIG. 1 and can be performed by the control module 120 of FIG. 1, in accordance with various exemplary embodiments. As can be appreciated in light of the disclosure, the order of operation within the method is not limited to the sequential execution as illustrated in FIGS. 3 and 4, but may be performed in one or more varying orders as applicable and in accordance with the present disclosure. As can further be appreciated, the methods of FIGS. 3 and 4 may be scheduled to run at predetermined time intervals during operation of the vehicle 100 and/or may be scheduled to run based on predetermined events.

FIG. 3 illustrates methods 600 for determining first and second vehicle spin-out conditions. The methods 600 of FIG. 3 are determinative on whether the process proceeds to the methods 700 of FIG. 4. Specifically, if the methods 600 of FIG. 3 do not determine a possible vehicle spin-out condition, e.g. conditions that are precursors of actual vehicle spin-out, then processing for determining actual vehicle spin-out according to the methods 700 of FIG. 4 is avoided.

At step 602, sensed signals from at least one of the sensors 130 of the IMU 150 and the EPS 140 are received by the sensor module 500. The sensor module 500 may process the signals as necessary for use by other modules.

At step 604, the front axle lateral force is estimated by the front lateral force estimate module 604. The front axle lateral force may be estimated based on lateral acceleration and yaw rate signals from the sensor module 500 using equation 1 above.

At step 606, SAT is estimated by the SAT estimation module 502 for at least one of the front tires using a known algorithm, which may require EPS torque from the sensor module 500.

At step 608, pneumatic trail, $t_p$, is estimated by determining a rate of change of front axle lateral force with respect to SAT using the pneumatic trail estimation module 512. The pneumatic trail estimation module 512 may estimate the rate of change using a suitable slope estimation algorithm such as a recursive least squares fit with forgetting factor, as described above. The pneumatic trail may be separately determined and used in subsequent steps for determining vehicle spin-out conditions, or it may be enveloped in total trail, which is used as representative of pneumatic trail in the subsequent steps, or pneumatic trail can be isolated based on a correction applied to total trail, as has been described above.

At step 610, a determination is made by the first vehicle spin-out condition module 504 as to whether pneumatic trail $t_p$ is decreasing for at least a predetermined period of time $t_1^*$, thereby determining whether a persistent decrease is occurring. Step 610 may be implemented by requiring a continuous decrease in pneumatic trail over the period of time, or a decrease in pneumatic trail at each of a number of discrete, regular, sample points over the period of time. If step 610 results in a positive assessment (Y for yes in the FIG. 3), that $t_p$ is decreasing through the period of time $t^*$, then the first flag 522 is raised in step 612. If step 610 results in a negative assessment (N for no in FIG. 3), then the methods 600 return to the first step 602.

At step 614, a determination is made by the second vehicle spin-out condition module 510 as to whether pneumatic trail $t_p$ is below a predetermined threshold $t_p^*$ for at least a predetermined period of time $t_2^*$, which is indicative of a high risk of impending vehicle spin-out. The period of time $t_2^*$ is selected to guard against transient or noise effects instigating the second flag 524. Pneumatic trail may be required to be below the threshold continuously for the period of time or at each of a certain number of regular sampling points corresponding to the period of time. In the event of a positive assessment (Y) that $t_p$ is below the predetermined threshold $t_p^*$, then the second flag 524 is raised at step 616. In the event of a negative assessment (N), the methods 600 proceed to step 618 to determine slip angle for the rear axle 102.

At step 618, a determination is made as to whether rear slip angle $\alpha_r$ is greater than a predetermined threshold value $\alpha_r^*$. The rear slip angle may be estimated using steering angle, yaw rate and longitudinal velocity from the sensor module 500. Rear slip angle is estimated by the rear axle slip angle estimation module 518 and possibly using equation 6 above. If a positive assessment (Y) is made at step 618, that the rear slip angle is above the predetermined threshold, then the second flag 524 is raised. If a negative assessment (N) is made at step 618, then the methods 600 return to the initial step 602.

By using pneumatic trail $t_p$ in determining vehicle spin-out condition, an indication of impending vehicle spin-out can be determined, potentially allowing sufficient time to apply appropriate corrections, whether automated or driver instigated, to avoid an actual vehicle spin-out.

The methods 600 can result in at least one of the first and second flags 616, 620 being output to the feature control module 520. The feature control module 520 responds to these flags by suitably controlling a vehicle feature as has been described above. Furthermore, if both flags 616, 620 have been produced, i.e. both the first and second vehicle spin-out conditions have been determined, then the process proceeds to determining actual vehicle spin-out based on vehicle side slip angle according to step 622 and methods 700 of FIG. 4.

The methods 700 of FIG. 4 of determining actual vehicle spin-out are partly performed by the third vehicle spin-out condition module 516 and the side slip angle estimation module. At step 702, a determination is made as to whether pneumatic trail $t_p$ for one vehicle axle 101, 102 is less than the predetermined pneumatic trail threshold $t_p^*$ or a determination is made as to whether slip angle $\alpha_r$ for the other vehicle axle 101, 102 is greater than the slip angle threshold $\alpha_r^*$. Step 702 is usually already performed by steps 614 and 618 of the methods 600 of FIG. 3 as described above as a precursor to entering methods 700 of FIG. 4. Step 702 is repeated in FIG. 4 to assist in describing the integrator reset step 704. In addition to a negative assessment (N) from step 702 resulting in a return to the initial step 602 of the methods 600 of FIG. 3, an integrator of the side slip angle estimation module 514 is reset at step 704. In this way, the integrator is always in a reset condition at the start of estimating vehicle side slip angle according to the methods 700 of FIG. 4. Further, step 702 is cyclically checked such that the subsequent integration steps are only performed whilst the potential vehicle spin-out inequalities of step 702 remain met, i.e. there is a persistent positive assessment from step 702.

If there has been a positive assessment (Y) in step 702, the methods 700 proceed to step 706. At step 706, sensed signals relating to assessment of vehicle side slip angle are received at the side slip angle estimation module 514 from the sensor module 500. For example, u, $a_y$, g, ψ, r corresponding to longitudinal velocity, lateral acceleration, gravity acceleration, vehicle roll angle and yaw rate respectively are read.

At step 708, vehicle spin-out factor $\dot{\beta}_x$ is estimated by the side slip angle estimation module 514. The estimation may be made by using equation 7 described above and factoring in the signals read from the sensor module 500 in step 706. In order to evaluate equation 7, it may be necessary to substitute an initial value for side slip angle $\beta_x$ since it is a recurring calculation. An exemplary initial value for side slip angle $\beta_x$ may be zero.

At step 710, an integration or summing step is performed by the side slip angle estimation module 514, whereby at least one previous value of the vehicle spin-out factor $\dot{\beta}_x$ determined by at least one previous iteration of step 708 is added to the spin out factor $\dot{\beta}_x$ determined in the current iteration of step 708. In this way, a value for vehicle side slip angle $\beta_x$ is estimated.

At step 712, an assessment is made by the third vehicle spin-out condition module 516 as to whether the estimated vehicle side slip angle $\beta_x$ is greater than a predetermined threshold $\beta_x^*$ therefor. The predetermined threshold $\beta_x^*$ is indicative of a likelihood of actual vehicle spin-out. For example, a threshold $\beta_x^*$ of 50° or greater may be chosen.

If step 712 returns a negative assessment (N) that the threshold $\beta_x^*$ has not been breached, then the step 706 of receiving new sensed values from the sensor module 500, the step 708 of calculating vehicle spin-out factor $\dot{\beta}_x$ and the step of integrating or summing vehicle spin-out factor $\dot{\beta}_x$ are iterated. The iterations are repeated, and vehicle spin-out factor continues to be accumulated, until either at least one of pneumatic trail $t_p$ is not below the pneumatic trail threshold $t_p^*$ or until axle lateral force $\alpha_r$ is not greater than the axle lateral force threshold $\alpha_r^*$ or until step 712 returns a positive assessment.

If step 712 returns a positive assessment (Y) that the threshold $\beta_x^*$ has been breached, then the third vehicle spin-out condition module 516 determines actual vehicle spin-out and the third flag 526 is set at step 714.

The feature control module 520 may respond to the third flag 526 by shutting down the EPS system 140 and/or other automated vehicle control system (such as a vehicle safety system like vehicle electronic stability control (ESC) systems, comprehensive safety vehicle (CSV) systems, and vehicle lane change assist systems), as has been described previously.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method for determining at least one vehicle spin-out condition, comprising:
   receiving at least one motion parameter of a vehicle based on sensed signals from at least one vehicle sensor;
   estimating at least one lateral axle force based on the at least one motion parameter, wherein the at least one motion parameter includes lateral acceleration and yaw rate;
   estimating self-aligning torque based on the at least one motion parameter, wherein the at least one motion parameter includes electric power steering torque;
   estimating pneumatic trail for at least one tire of the vehicle using the at least one lateral axle force and the self-aligning torque;
   determining a state of decreasing of the pneumatic trail to determine a first vehicle-spin out condition; and
   in response to the determining the state, comparing the pneumatic trail to a threshold to determine a second vehicle spin-out condition.

2. The computer implemented method of claim 1, the method comprising, in response to the determined at least one vehicle spin-out condition, performing at least one of: shutting down at least one function of a vehicle control system, automated vehicle control to counteract vehicle spin-out, and output of a vehicle spin-out warning for a driver of the vehicle.

3. The computer implemented method of claim 1, comprising estimating slip angle and determining a third vehicle spin-out condition based on the slip angle.

4. The computer implemented method of claim 3, wherein the slip angle is estimated by an integration or summation based computation that integrates or sums estimated vehicle spin-out factor with respect to time.

5. The computer implemented method of claim 1, wherein the pneumatic trail is estimated for one of front and rear axles of the vehicle, and the method comprises estimating a slip angle of an other axle of the front and rear axles of the vehicle, and determining a third vehicle spin-out condition based on the estimated slip angle of the other axle.

6. A vehicle comprising at least one module for carrying out the method of claim 1 and the at least one sensor.

7. A system, comprising:
   a non-transitory computer readable medium, comprising:
   a first module configured to receive at least one motion parameter of a vehicle based on sensed signals from at least one vehicle sensor, estimate at least one lateral axle force based on the at least one motion parameter, wherein the at least one motion parameter includes lateral acceleration and yaw rate, and estimate self-aligning torque based on the at least one motion parameter, wherein the at least one motion parameter includes electric power steering torque;
   a second module configured to estimate pneumatic trail for at least one tire of the vehicle using the at least one lateral axle force and the self-aligning torque;
   a third module configured to determine a state of decreasing of the pneumatic trail to determine a first vehicle-spin out condition, and in response to the determining the state, determine a second vehicle spin-out condition based on the estimated pneumatic trail.

8. The system of claim 7, comprising a sixth module responsive to the determined at least one vehicle spin-out condition and configured to perform at least one of: shutting down at least one function of a vehicle control system, automated vehicle control to counteract vehicle spin-out, and output of a vehicle spin-out warning for a driver of the vehicle.

9. The system of claim 7, comprising a seventh module configured to estimate slip angle, wherein the third module is configured to determine a third vehicle spin-out condition based on the slip angle.

10. The system of claim 9, wherein the seventh module is configured to estimate slip angle by an integration or summation based computation that integrates or sums estimated vehicle spin-out factor with respect to time.

11. The system of claim 7, wherein the second module is configured to estimate pneumatic trail for one of front and rear axles of the vehicle, and the system comprises an eighth module configured to estimate a slip angle of an other axle of the front and rear axles of the vehicle, wherein the third module is configured to determine a second vehicle spin-out condition based on the estimated slip angle of the other axle.

12. A vehicle comprising the system of claim 7 and the at least one sensor.

* * * * *